UNITED STATES PATENT OFFICE.

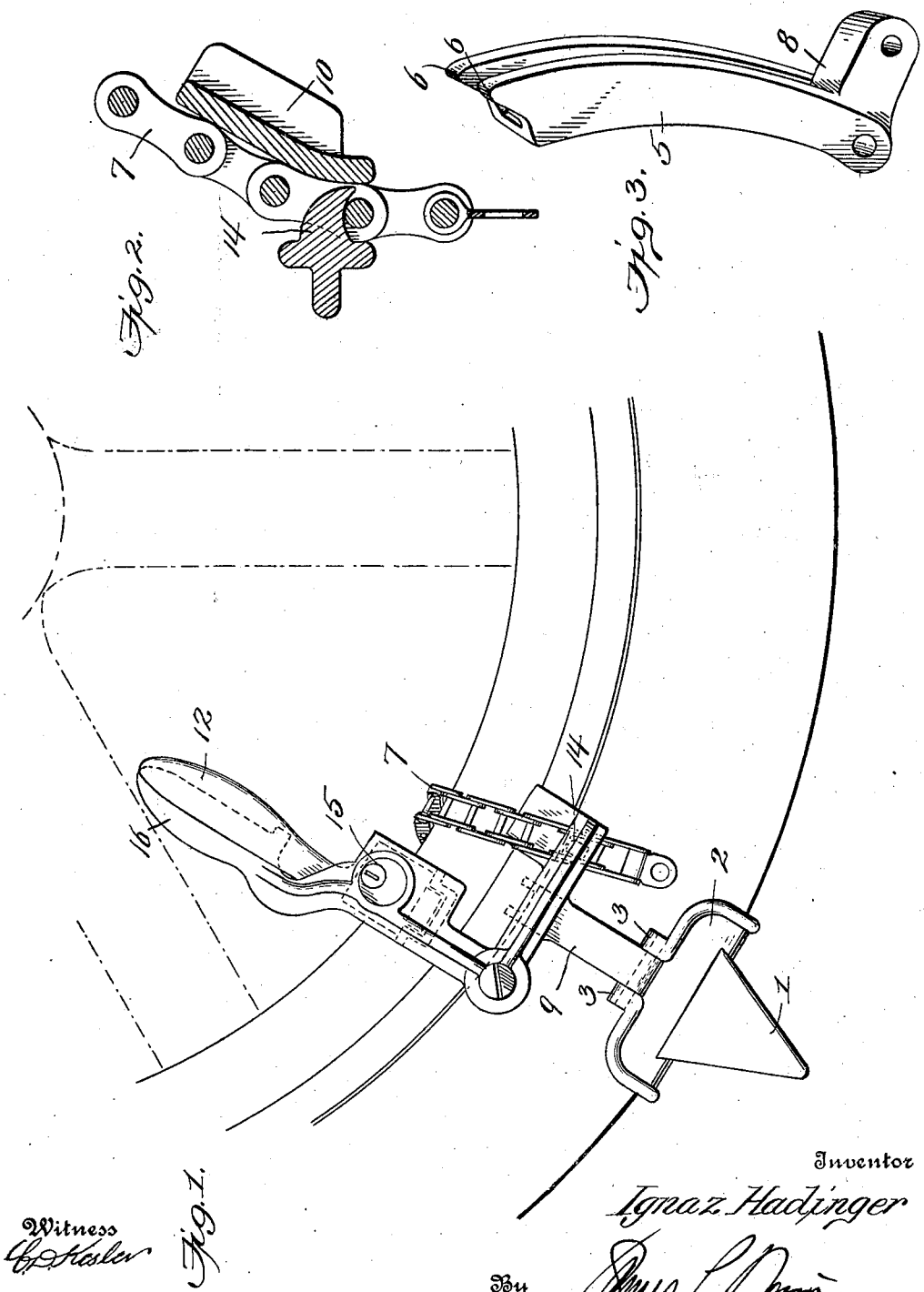

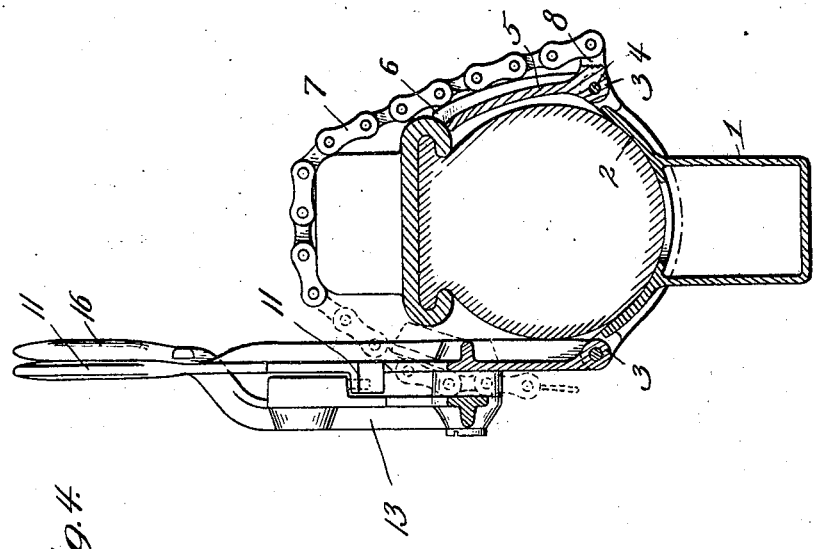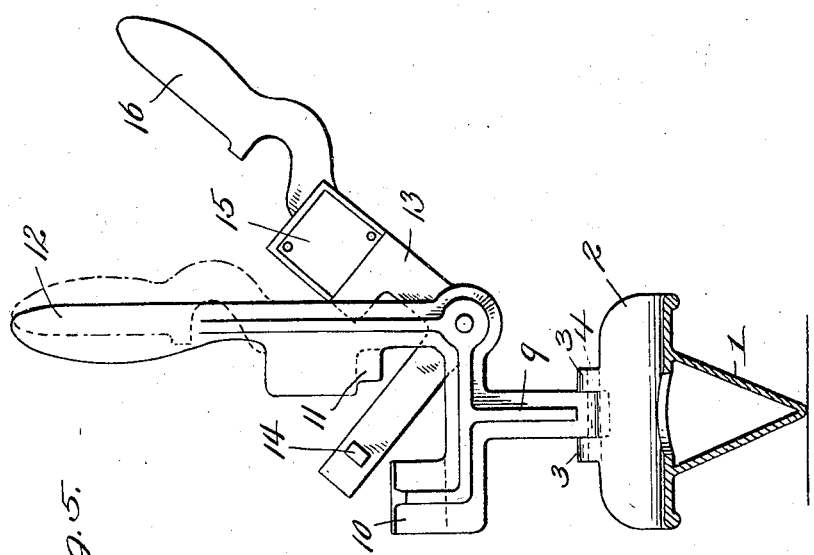

IGNAZ HADINGER, OF POTTSVILLE, PENNSYLVANIA.

WHEEL-LOCK.

1,351,644.  Specification of Letters Patent.  Patented Aug. 31, 1920.

Application filed March 29, 1920. Serial No. 369,714.

*To all whom it may concern:*

Be it known that I, IGNAZ HADINGER, a citizen of the United States, residing at Pottsville, in the county of Schuylkill and State of Pennsylvania, have invented new and useful Improvements in Wheel-Locks, of which the following is a specification.

This invention relates to theft preventing devices or wheel locks of the chock type and which are particularly adapted for use in connection with motor vehicles.

The objects are to provide a device of the character herein set forth which can be readily applied to the rim and tire of one of the wheels of a vehicle which in such application and use will not injure or mar the wheel, spokes or tire, which is adapted for use on wheels and tires of various sizes and which, when placed in operative position, will effectually prevent unauthorized use of the vehicle with which it is connected.

With the above and other objects in view, my invention consists in certain features of structure, combination and relation which will be more fully set forth hereinafter.

I have illustrated one embodiment of my invention in the accompanying drawings, wherein:—

Figure 1 is a side elevation showing my device as applied to a vehicle wheel;

Fig. 2 is a detail of a portion of the chain connector and chain latch;

Fig. 3 is a detail of the centering dog or arm;

Fig. 4 is a view, partly in transverse vertical section, of the device as applied to a vehicle rim;

Fig. 5 is a side elevation of the device in unlocked or open position.

Referring to the drawings wherein similar numerals denote like parts throughout the several views:

I provide a chock or spur portion 1 which should be of sufficient size so as to seriously retard rotatiotn of the wheel when in position thereon. This chock is provided with a curveed base or plate portion 2 which is adapted to engage the tread surface of the vehicle tire. The plate or bed 2 is provided on opposite sides with pairs of bosses designated as 3. In one pair of the bosses I mount, by suitable means, such as by a pin 4, a dog or centering arm 5. This dog is shaped so as to conform to the side of a tire and is formed at its free end with a flanged or toothed portion 6, adapted to engage a portion of the rim whereby the chock is maintained against lateral movement in one direction. A chain 7 which is adapted to surround the inner side of the felly of the wheel is connected to the chock portion. I have shown what I now consider to be the preferred means of connecting this chain wherein it is pivoted to a knuckle 8 projecting from the centering dog 5. By making the connection in this manner, when the chain is tightened over the felly, the flanged or toothed portion of the dog will be pressed tightly against and maintained in engagement with the rim.

The chain used in connection with this device may be of such length as to fit over the felly of the largest sized rims and tires and is secured in place by the means and in the manner hereinafter set forth.

In the second pair of bosses on the curved plate 2 is pivoted a lever 9 which is formed with an inwardly projecting flanged portion 10 adapted to engage the edge of the rim in a manner similar to the centering dog hereinbeforee referred to. The lever also carries a lock keeper 11 and is provided with a suitable handle 12.

A second lever 13 is pivoted to lever 9. This lever carries a stud or pin 14 which is adapted when the levers are in closed relation to assume a position adjacent the outer side of the outer flange 10 of the first-named lever. This stud or pin is adapted to receive one of the links of the chain whereby the chain is maintained in position around the felly. The lever 13 carries a suitable lock 15, the bolt of which is adapted to engage the keeper 11 and is further provided with a suitable handle portion 16.

In the application of my device to a vehicle wheel, the curved base of the chock portion is placed upon the tread surface of the tire and the chain is passed over the felly of the wheel, the toothed end of the centering dog 5 bearing upon one portion of the rim of the wheel. At this phase of the operation, the lever should be in open position, as indicated in Fig. 5 of the drawings. The free end of the chain is hooked over the stud 14 of lever 13 whereupon lever 13 may be moved to closed position until it assumes the position indicated in Fig. 4 of the drawings. It is evident that as the stud 14 moves toward plate 10 of lever 9 that the chain will be tightened about the felly and when the levers have reached a closed position this plate will prevent removal of the chain from the stud.

The lock may then be actuated, whereupon the levers cannot be moved to free the chain until the lock has been released. It will be seen that in its locked position on the wheel the centering dog 5 and the flanged portion 10 of one of the levers will be maintained in engagement with opposite sides of the rim of the wheel whereby the chock will be maintained centered on the tread portion and any lateral movement of the chock relative to the wheel will be prevented.

I claim:—

1. In a device of the character set forth, a chock adapted to be positioned on the tread surface of a vehicle wheel, means for securing said chock to the wheel, and rim-engaging means carried by said chock for maintaining the chock in centered position on the wheel while said chock and securing means are being placed in operative position.

2. In a device of the character set forth, a chock, a centering arm pivoted to said chock, a chain connected at one end to said centering arm and means carried by said chock member and coöperating with said chain to lock said centering arm and chock in operative position.

3. In a device of the character set forth, a chock member adapted to be positioned on the tread surface of a wheel, a chain connected to said chock member, a pair of levers adapted to be moved relative to one another and connected to said chock member, one of said levers being provided with means for engaging said chain, and means for locking said levers against movement relative to one another.

4. In a device of the character set forth, a spur member provided with a curved base and adapted to fit the tread surface of a tire, a pair of levers connected to said base portion, a lock on one of said lever members, a lock-keeper on the other lever member, a stud on said first-named lever member, and means adapted to encircle a wheel felly and to engage said spur whereby the device may be maintained in position.

5. In a device of the character set forth, a chock member provided with a curved base, a chain connected to said chock member, a pair of levers connected to said chock, an inwardly projecting flange extending from one of said levers, a lock keeper on said lever, a stud on the other of said levers, and a lock on said second-named lever.

6. In a device of the character set forth, a chock member provided with a curved base, a dog pivoted to said base, felly encircling means connected to said dog, a pair of levers connected to said base, and means carried by said levers adapted to receive, retain, and lock the free end of said felly encircling means whereby to retain the chock in position.

7. In a device of the character described, a chock member adapted to be applied to the tire of a vehicle wheel, a centering dog pivoted to said chock, a lever connected to said chock having an inwardly extending flange, felly encircling means connected to said dog and means carried by said lever adapted to engage said felly encircling means and maintain said dog and said flange in engagement with the rim of the wheel.

8. In a device of the character described, a chock member adapted to be positioned on the tread surface of a tire, a centering arm pivoted to said chock, a lever connected to said chock having an inwardly extending flange, felly encircling means connected to said chock and means carried by said lever for locking said encircling means in inaccessible relation to said flange.

9. In a device of the character described, a chock member provided with a curved base portion, oppositely disposed pairs of bosses on said base portion, a dog pivoted in one pair of said bosses, a knuckle projecting from said dog, a chain secured at one end to said knuckle, a pair of levers connected to the other pair of bosses, and means carried by said levers to engage and lock the free end of said chain.

10. In a device of the character described, a chock member, a centering arm pivoted to said chock member, a chain secured to said centering arm, a lever pivotally secured to said chock, a second lever pivoted to said first-named lever, and capable of movement relative thereto, and means carried by said levers and adapted to engage one end of said chain and to tighten or loosen said chain, and means for locking said levers when the chain is in tightened position.

11. In a device of the character described, a chock adapted to be positioned on the tread surface of the tire of a vehicle wheel, a member connected at one end to said chock, a lever pivoted to said chock and movable transversely relatively thereto, a second lever pivoted to said first named lever for longitudinal movement relatively to the wheel, said second lever having means adapted to move said member into engagement with the felly of the wheel and lock the other end thereof between said levers.

12. In a wheel lock, a chock adapted to be applied to the tire thereof, a flexible member connected to said chock and means comprising relatively movable levers for tightening and locking said flexible member about the felly of the wheel.

In testimony whereof I have hereunto set my hand in presence of two subscribing witnesses.

IGNAZ HADINGER.

Witnesses:
 CHAS. F. OST,
 WILLIAM F. WEBER.